United States Patent [19]

Kashiwai et al.

[11] Patent Number: 4,869,120
[45] Date of Patent: Sep. 26, 1989

[54] APPARATUS FOR TAKING-OFF POWER FROM A TRANSMISSION TO A SPEEDOMETER IN A MOTORCYCLE

[75] Inventors: Mikio Kashiwai; Teruo Kihara, both of Saitama, Japan

[73] Assignee: Honda Giken Kogyo Kabushiki Kaisho, Tokyo, Japan

[21] Appl. No.: 223,906

[22] Filed: Jul. 25, 1988

[30] Foreign Application Priority Data

Jul. 25, 1988 [JP] Japan ................................ 63-184696

[51] Int. Cl.4 ............................................. F16H 37/00
[52] U.S. Cl. ....................................................... 74/12
[58] Field of Search ................................ 74/12; 464/52

[56] References Cited

U.S. PATENT DOCUMENTS

| | | | |
|---|---|---|---|
| 1,694,761 | 12/1928 | Zubaty | 464/52 |
| 3,247,729 | 4/1966 | Stadelman | 74/12 |
| 3,781,036 | 12/1973 | Brilando | 74/12 X |
| 4,441,378 | 4/1984 | Ponczek | 74/606 R X |
| 4,560,365 | 12/1985 | Weaver | 74/12 X |

FOREIGN PATENT DOCUMENTS 1368169  5/1963  France ................................ 74/12
59-18360  5/1984  Japan.

Primary Examiner—Leslie A. Braun
Assistant Examiner—Janice E. Chartoff
Attorney, Agent, or Firm—Lahive & Cockfield

[57] ABSTRACT

This invention pertains to a power take-off device for taking-off power from a rotary output shaft of a transmission, through an output gear connected to a speed meter cable and an input gear meshing with the output gear, to a speedometer in a motorcycle.

The improvement provided by the invention resides in a combination including: a drive sprocket mounted on a projecting portion of the transmission output shaft, which shaft projects outwardly from a tranmsission case; a sprocket cover for covering the drive sprocket; a gear case for housing the input gear and the output gear; and a connecting means provided at an end of the output shaft of the tranmission for connecting a rotating shaft of the input gear to the output shaft of the transmission.

The gear case is operable to support the rotating shaft of the input gear for detachable driven engagement with the connecting means of the output shaft of the transmission.

3 Claims, 5 Drawing Sheets

APPARATUS FOR TAKING-OFF POWER FROM A TRANSMISSION TO A SPEEDOMETER IN A MOTORCYCLE

BACKGROUND OF THE INVENTION

1. Field of the Invention

DESCRIPTION OF THE RELATED ART

Conventionally, there exists a known device for taking off rotative power from an output shaft of a transmission, by way of an output gear connected to a speedometer cable and an input gear meshing with the output gear, to a speedometer. In such a prior art device, the speedometer input gear is integrally formed with an end portion of the transmission output shaft located on the shaft end opposite to that supporting a drive sprocket. The speedometer output gear is mounted by an output gear supporting portion formed on the transmission case. In this respect, by way of example, reference is made to Japanese Utility Model Publication 59-18360(1984).

PRIOR ART PROBLEMS

In replacing a drive sprocket with another one having a different number of teeth, so as to change a final reduction ratio, it is necessary to also replace the input gear and the output gear with other gears having a different gear ratio, so as to prevent the occurrence of error in the speedometer reading. However, in the prior art device as noted above, as the speedmeter input gear is integrally formed with the transmission output shaft, it is required to dismantle the transmission case and replace the output shaft with another one, which makes the operation troublesome.

Thus, as is disclosed in Japanese Utility Model Publication No. 59-18360, a rotative power take-off device for a vehicle such as a forklift may be provided with a gear case housing, with a speedometer input gear and output gear being mounted on an end wall of the transmission case on the side opposite to that where a drive pinion is located. Consideration has been given to applying such an arrangement to a motorcycle by detachably mounting the gear case to an end wall of the transmission case, on the side opposite of the case side where the drive sprocket is located, to thereby facilitate a change in the gear ratio of the input gear and the output gear without dismantling the transmission case.

However, in the transmission case of such a motorcycle, a clutch is mounted on the end wall of the transmission case on the side opposite to the side where the drive sprocket is located. Therefore, the gear case is concealed by the clutch and the clutch must be removed in order to replace the gear case. Thus, any speedometer gear replacement operation in such an arrangement in not easy.

Accordingly, it is an object of the present invention to provide a rotative power take-off device which may solve and thus substantially eliminate the above noted problem.

SUMMARY OF THE INVENTION

According to the present invention, there is provided an improvement in a device for taking-off rotative power from an output shaft of a transmission, through an output gear connected to a speedometer cable and an input gear meshing with the output gear, to a speedometer in a motorcycle. The improvement comprises
    a drive sprocket mounted on a projecting portion of an output shaft projecting outwardly from a transmission case,
    a sprocket cover for covering the drive sprocket,
    a gear case for housing the input gear and the output gear, and
    a connecting portion provided at an end of the output shaft for connecting a rotating shaft of the input gear to the output shaft, with
    the gear case being mounted in such a manner that the rotating shaft
    of the input gear is detachably engaged with the connecting portion.

With this inventive combination, in changing a final reduction ratio, the sprocket cover is first removed, and the drive sprocket is replaced by another one having a different number of teeth. Then, the input gear and the output gear, which are now accessible, may be are replaced by other ones having a different gear ratio. Alternatively, the gear case, which may be separable from the sprocket cover, may be replaced by another one. Then, the sprocket cover may be remounted onto the transmission case.

With this arrangement, the rotating shaft of the speedometer input gear is detachably engaged with the connecting portion provided at the end of the output shaft of the transmission, and the speedometer cable is connected through the output gear and the input gear to the transmission output shaft.

In a generic sense, this inventive concept embodies an improvement in a device for taking-off power:
    from a rotary output shaft of a transmission,
        through
            an output gear connected to a speed meter cable and
            an input gear meshing with said output gear,
        to a speedometer in a motorcycle.
This improvement comprises:
    a drive sprocket mounted on a projecting portion of the transverse output shaft, which shaft projects outwardly from a transmission case;
    a sprocket cover for covering the drive sprocket;
    a gear case for housing the input gear and the output gear; and
    a connecting means provided at an end of the output shaft of the transmission for connecting a rotating shaft of the input gear to the output of the transmission; and
    the gear case being operable to support the rotating shaft of the input gear for detachable driven engagement with the connecting means of the output shaft of the transmission.

In one species embodiment this improvement further comprises:
    a seating surface formed on the sprocket cover,
    the gear case being removably mounted on the seating surface such that
        the rotating shaft of the input gear is drivenly engaged with the connecting portion of the output shaft of the transmission.

In yet another species embodiment of the invention:
    the gear case for housing the input gear and the output gear
        is formed integrally with the sprocket cover,
        projects into an interior, generally central area housed by the sprocket cover, is disposed in general axial alignment with the output shaft of the transmission, and is operable to dispose the input gear in detachable, driven cooperation with the connecting means provided at the end of the output shaft of the transmission; and a protecting cover portion is formed integrally with a forward facing portion of the sprocket cover, with the protecting cover portion being operable to protect and shield conduit connection means associated with the transmission.

In now proceeding to describe details of presently preferred embodiments of the invention, reference will be made to the accompanying drawings. In this connection, it is to be understood that these illustrated embodiments are set forth by way of example and not by way of limitation of the invention.

BRIEF DESCRIPTION OF THE INVENTION

Figure 3:
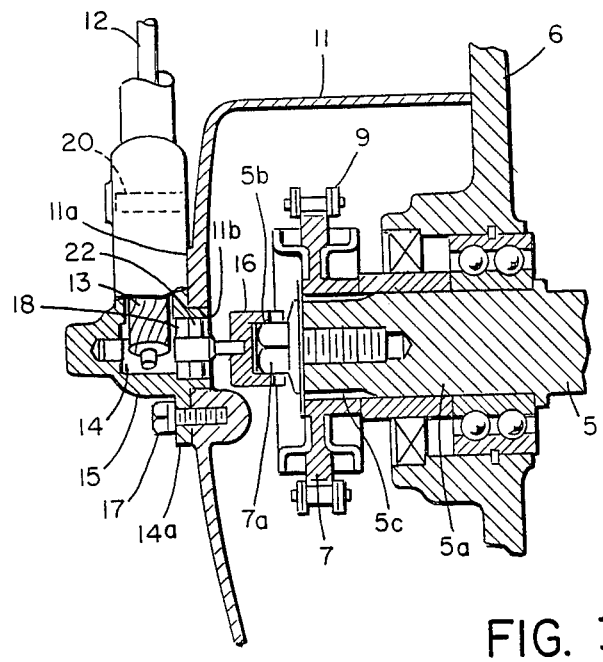
FIG. 3 is a cross-section taken generally along the line III—III of FIG. 2 and showing details of a separable gear case species of the invention.
Figure 4:
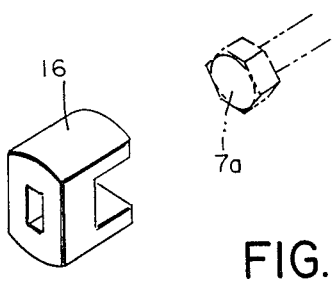
Figure 5:
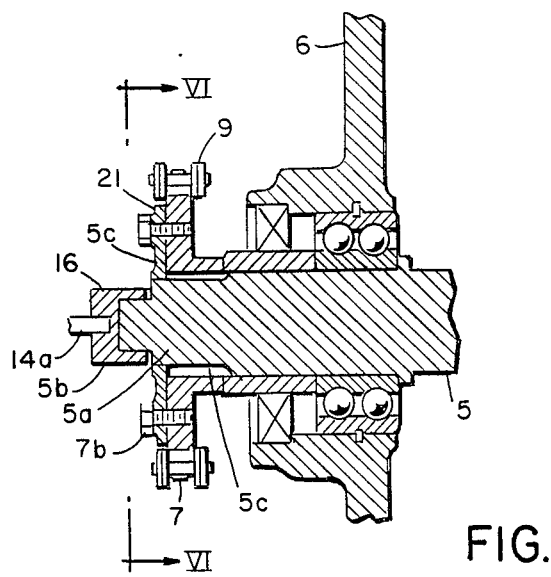
Figure 6:
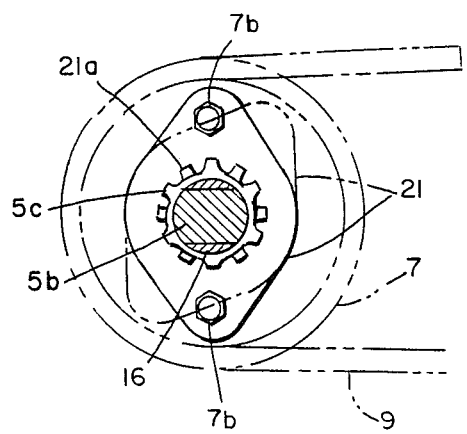
Figure 7:
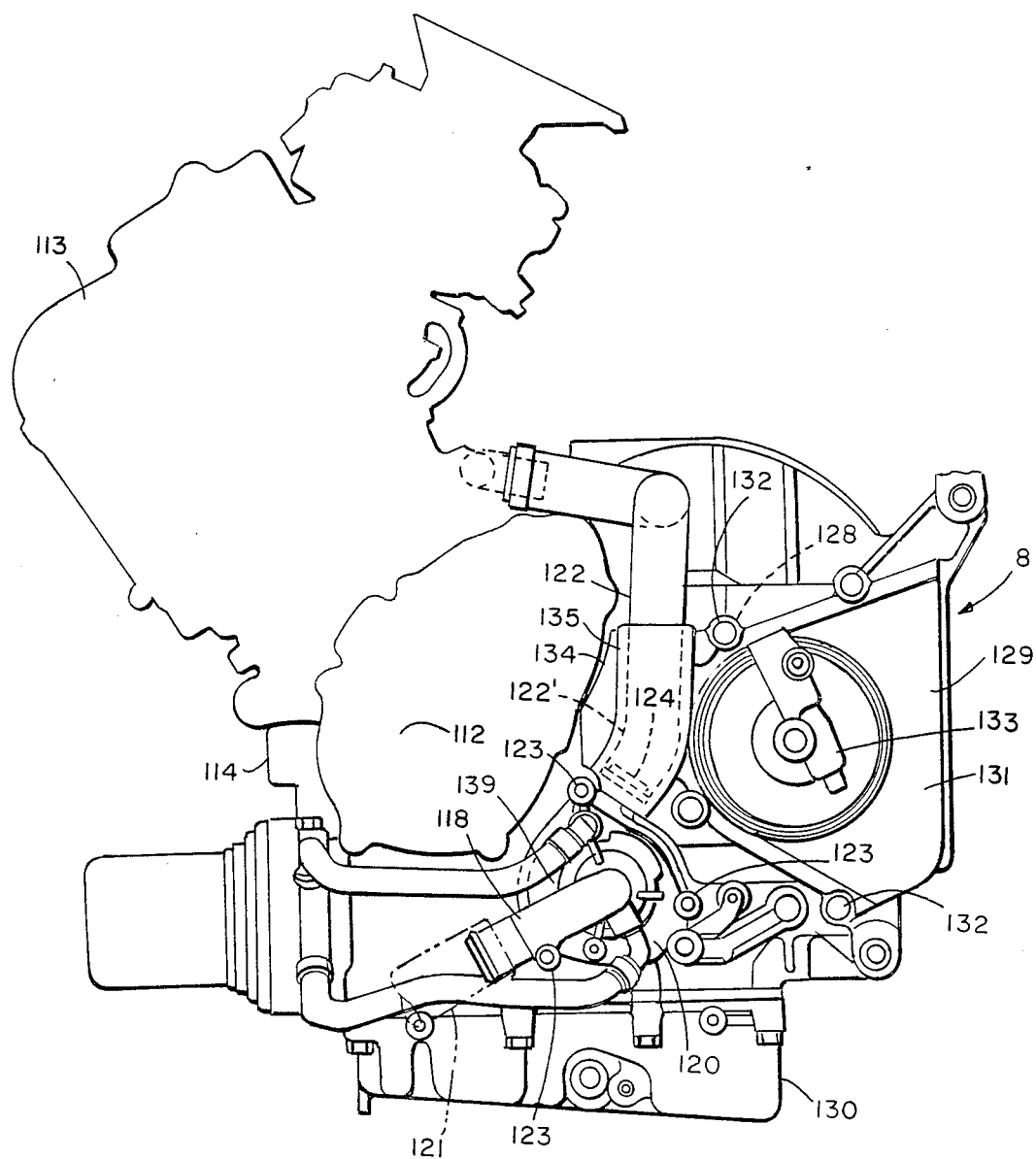
Figure 8:
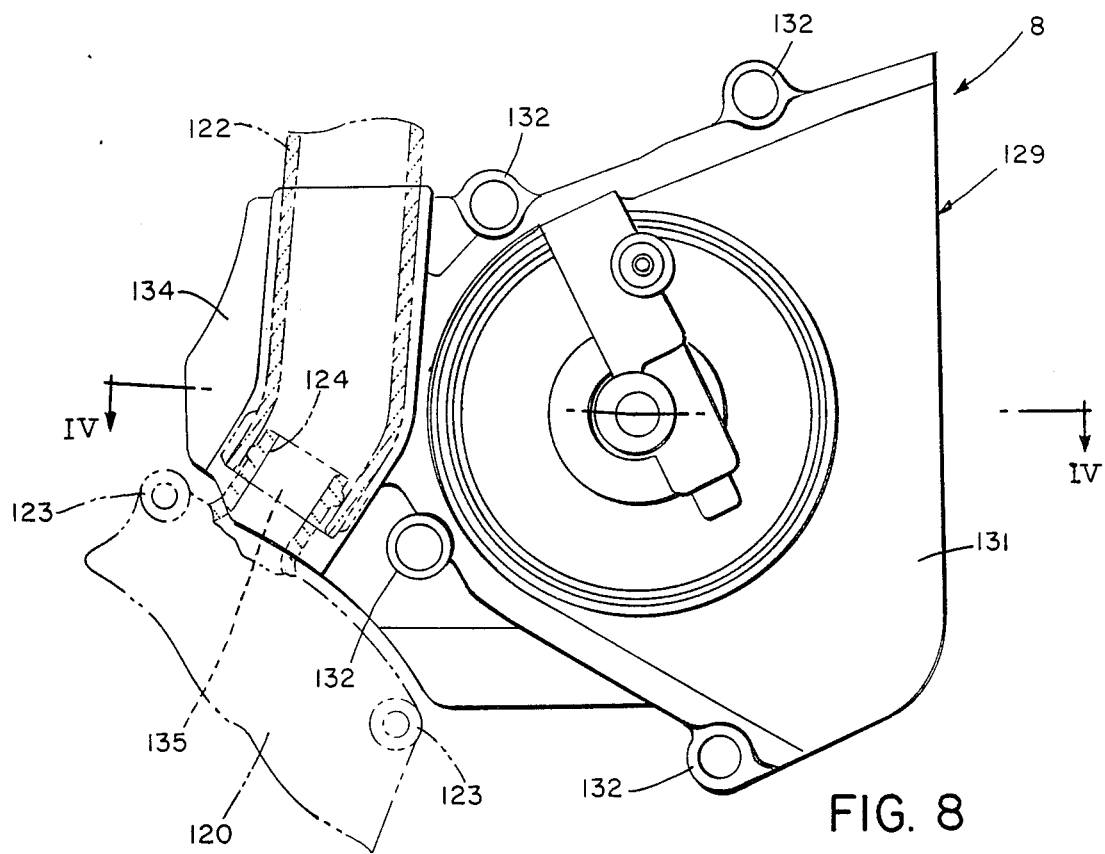
Figure 9:
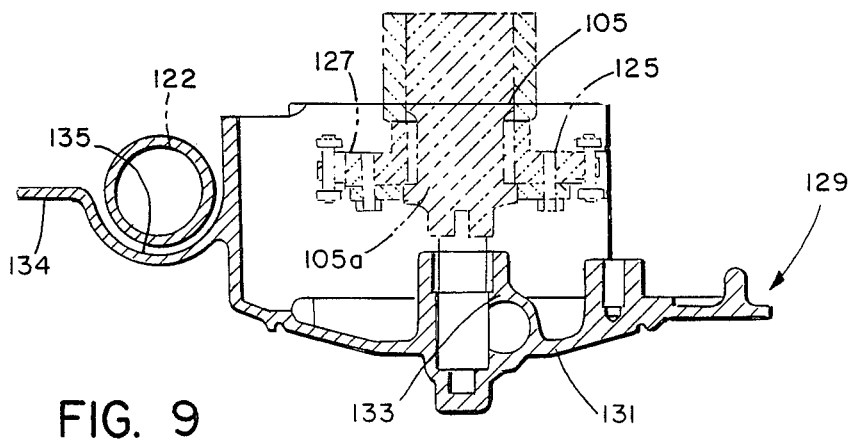

FIG. 4 provides a perspective view of separated elements of the drive connection between a transmission shaft and the speedometer input in FIG. 3;

FIG. 5 provides a cross-sectioned view of a modified form of the FIG. 3 assembly;

FIG. 6 is a cross-section taken along the line IV—IV in FIG. 5;

FIG. 7 provides a side view of a motorcycle engine and transmission assembly embodying another presently preferred species of the invention;

FIG. 8 provides an enlarged, fragmentary view of the species of FIG. 7, showing details of an integrated sprocket cover and gear case species of the invention; and FIG. 9 is a sectional view of the FIG. 8 assembly, as viewed along section line IV—IV of FIG. 8.

By way of facilitating the ensuring discussion, frequently referred to structural elements will be identified as follows:

FIGS. 1-6 Embodiments

| Reference Numeral | Element |
| --- | --- |
| 5 | output shaft of transmission |
| 5a | projecting portion of transmission output shaft |
| 5b | connecting portion of transmission shaft |
| 6 | transmission case |
| 7 | drive sprocket |
| 10 | speedometer |
| 11 | sprocket cover |
| 11a | seat surface |
| 12 | speedometer cable |
| 13 | speedometer output gear |
| 14 | speedometer input gear |
| 14a | rotating shaft of speedometer input gear |
| 15 | speedometer gear case |

FIGS. 7-9 Embodiments

| Reference Numeral | Element |
| --- | --- |
| 112 | generator |
| 118 | water inlet |
| 120 | water pump |
| 121 | water hose |
| 122 | connecting tube |
| 123 | connecting means |
| 124 | water outlet |
| 125 | sprocket |
| 127 | drive chain |
| 128 | cover fitting seat means |
| 129 | sprocket cover |
| 130 | oil pan |
| 131 | sprocket cover |
| 132 | fitting bolt |
| 133 | gear case |
| 134 | protecting cover portion |
| 122' | base of connecting tube |
| 139 | water pump cover |

DESCRIPTION OF THE PREFERRED EMBODIMENTS

In describing presently preferred embodiments of the invention, the species of FIGS. 1-6 will first be discussed in the context of generic and first species aspects of the invention.

Referring now to FIGS. 1 to 4, reference numeral 1 designates a motorcycle including a front wheel 2, a rear wheel 3, and an engine 4 located generally between the wheels 2 and 3. As shown in FIG. 3, a drive sprocket 7 is mounted by a fixing bolt means 7a on a projecting portion 5a of an output shaft 5 of a transmission of the engine 4. This portion 5a projects outwardly from a transmission case 6.

Figure 1:
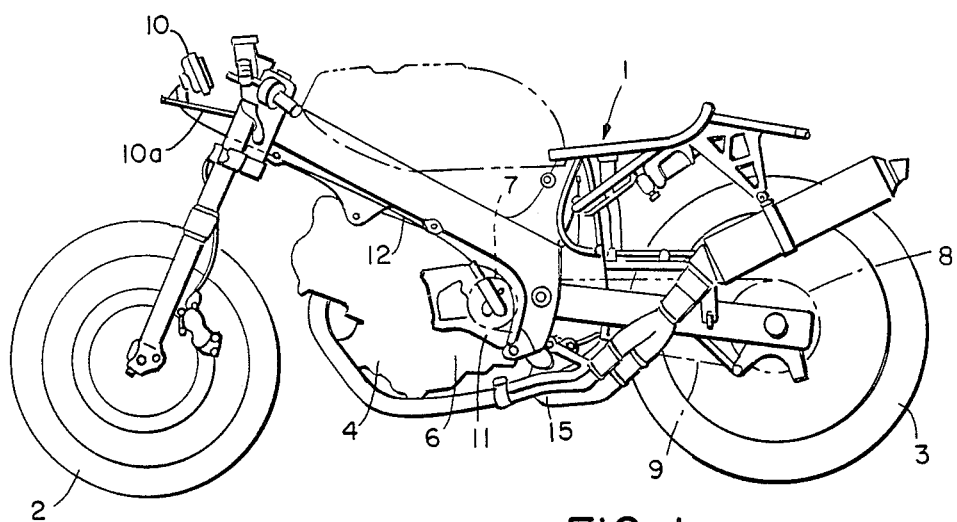
FIG. 1 is a side view of a motorcycle provided with one preferred embodiment of the speedometer power take-off device of present invention.

A driven sprocket 8, shown in FIG. 1, is connected to the rear wheel 3. A roller-type drive chain 9 pauses around the drive procket 7 and the driven sprocket 8 to thereby drive the rear wheel 3.

A speedometer 10 is mounted on a bracket 10a extending forwardly from a top portion of a front fork of the motorcycle 1.

The drive sprocket 7 is covered by a sprocket cover 11. An outer surface of the sprocket cover 11 is formed with a seat surface 11a adapted for mounting a gear case 15 thereon. Although the seat surface 11a may be formed on the outside surface of the sprocket cover 11, as illustrated, it may alternatively be formed on the inside surface of the sprocket cover 11.

A speedometer cable 12 is connected at its one end to the speedometer 10, and is connected at its other end to an output gear 13. The output gear 13 is meshed with an input gear 14. The output gear 13 and the input gear 14 are accommodated, i.e., housed, in a gear case 15.

The seat surface 11a is intersected by a through-hole 11b. A rotating shaft 14a of the input gear 14 is inserted through hole 11b. A joint or coupling 16 shown in FIG. 4 is connected at its one end with an end of the rotating shaft 14a. The joint 16 is detachably engaged at its other end with a socketingly received, head of a bolt 7a serving as a connecting member 5b.

The gear case 15 is detachably fixed to the seat surface 11a by threadably securing bolts 17 in position, generally as shown. Thus, rotative power from the output shaft 5 is transmitted through the joint 16, the intermeshed input gear 14 and output gear 13, and the speedometer cable 12, to the speedometer 10.

Figure 2:
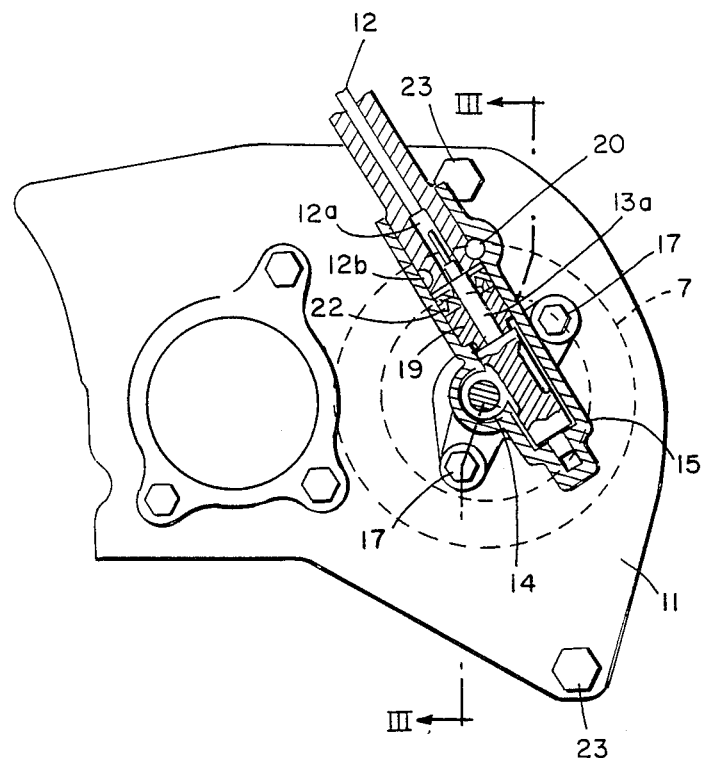
FIG. 2 is an enlarged, fragmentary, partially sectioned side view of a portion of FIG. 1 showing details of the speedometer power take-off.

As is shown in FIGS. 2 and 3, a bushing 18 for supporting the rotating shaft 14a of the input gear 14 and a bushing 19 for supporting the rotating shaft 13a of the output gear 13 are press-fitted into respective openings formed through the gear case 15. The end portion of the speedometer cable 12 is inserted into the opening for the output gear 13 in the gear case 15 in such a manner that an end of the rotating shaft 13a of the output gear 13 is detachably engaged with a connecting recess 12a of the cable 12. A locking screw 20 is threadedly engaged in the gear case 15 in such a manner as to be lockingly received in a groove 12b formed on the outer circumference of an outer tube of the speedometer cable 12.

In changing the input gear 14 and the output gear 13, the locking screw 20 is loosened to release the speedometer cable 12. Then, the gear case 15 may be replaced by another gear case including another input gear and another output gear with a different gear ratio. Alternatively, the gears themselves may be replaced within the original gear case.

Reference numeral 22 designates oil seals engaged with openings of the gear case 15, and reference numeral 23 designates tightening bolts for fixing the sprocket cover 11 to the transmission case 6.

In the above described embodiment, the connecting portion 5b for connecting the output shaft 5 with the rotating shaft 14a of the input gear 14 is provided by the head of the bolt 7a which serves to fix or secure the drive sprocket 7, so as to make the fabrication and operation of the output shaft 5 easy.

Another modified embodiment is shown in FIGS. 5 and 6. In this modified embodiment, the output shaft 5 is integrally formed with a connecting portion 5b having a modified, i.e., splined cross-section. The output shaft 5 is thus formed with a splined portion 5c. A support plate 21 having notch or alternating groove and tooth means 21a is detachably and lockingly engaged with the splined portion 5c of the output shaft 5. The groove means 21a has generally the same tooth and groove profile as that of the splined portion 5c.

In mounting the support plate 21 onto the splined portion 5c of the output shaft 5, the support plate 21 may first be axially engaged with the splined shaft end and moved axially to an annular groove which circumferentially intersects the shaft splines. The plate 21 may then be rotated from a condition shown by a phantom line in FIG. 6, to a locked and secured condition shown by a solid line, where the teeth like portions of the central opening of plate 21 are moved into axially alignment with spline ends facing the annular groove. As a result, the teeth of the notch means 21a of the plate 21 are rotated into axial locking cooperation with crests of teeth of the spline portion 5c, thereby preventing the plate 21 from being axially disengaged. The support plate 21 is fixed to the drive sprocket 7 by bolts 7b. Thus, the sprocket 7 is fixed through the support plate 21 to the output shaft 5, with appropriate frictional interaction of the components maintaining their desired positioning.

As described above, the input gear and the output gear are accommodated in the gear case, and the gear case is mounted on a seat surface formed on the sprocket cover. Therefore, a final reduction ratio may be readily changed without dismantling the transmission case or removing the clutch. Accordingly, the gear case and the drive sprocket may be easily replaced, without the complications entailed in the prior art structure.

With overall generic aspects of the invention having been demonstrated in the context of a first species, characterized by a separable gear case arrangement, it is now appropriate to give consideration to an integrated gear case/sprocket cover species of the invention. This species is depicted, by way of example, in FIGS. 7-9.

Turning first to FIG. 7, it is appropriate to review overall engine components as shown there. An engine generator is there identified by the reference numeral 112. The engine and crankcase of this assembly are denoted by reference numerals, 113 and 114, respectively. A water pump 120 is provided with a water inlet 118 to which is connected a water hose 121.

A water conduit connecting tube 122 extends from the engine 113, depicted in the upper left portion of FIG. 7, and connects via conduit base 122' with a pump water outlet 124 as generally shown in FIGS. 7 and 8.

Reference numerals 123 are employed in each of FIGS. 7 and 8 to generally depict connecting means associated with the water pump assembly.

As shown in FIG. 9, drive sprocket 125 is supported on the projecting end 105a of the transmission shaft 105 and is deposed in driving engagement with a drive chain means 127.

A transmission periphery provides a cover accepting or mounting seat means 128 to which is affixed a sprocket and gear cover 129, as generally shown in FIGS. 7, 8 and 9. Cover 129 is secured to the right side of the transmission as shown in FIG. 7, generally above the location of the oil pan means 130.

Overall cover means 129 includes, as integrated components of a single structure, a sprocket cover 131 which generally encircles a more-or less centrally located gear case 133. Gear case 133, as shown in FIG. 9, is disposed in generally axially aligned relation with the transmission shaft so as to provide for the detachable driven engagement cooperation in the manner generally described earlier in connection with FIG. 5.

Sprocket cover/gear case means 129 is further uniquely provided with a generally forwardly facing, partially concave, lip-like extension means 134, as shown in plan view in FIGS. 7 and in transverse profile in FIG. 9. Protecting cover portion 134 is formed integrally with a forward facing portion of the sprocket cover means 131 and, as shown in FIG. 9, has a concave portion 135 nestling with, and extending partially over so as to partially encircle the outer periphery of the conduit inter connection between components 122 and 124. In this manner, the protecting cover portion 134 is operable to peripherally protect and shield the conduit connection means of the water pump associated with the engine transmission.

REVIEW OF INVENTION

Specific details of the invention have been described with reference to various presently preferred embodiments. By way of facilitating a review and summary of the invention, reference will now be made first to the overall generic inventive concept, then to the separable gear cover species, and finally to the integrated gear cover/sprocket cover species. In this connection, by way of facilitating this review, the description will incorporate representative reference numerals from the drawings for purposes of illustration only and certainly not by way of limitation of the invention.

In a generic sense, this invention pertains to a device for taking-off power from a rotary output shaft (5 or 105) of a transmission through an output gear (13) connected to a speed meter cable and an input gear (14) meshing with the output gear to a speedometer in a motorcycle.

The generic improvement herein comprises:

a drive sprocket (7 or 125) mounted on a projecting portion (5a or 105a) of the transmission output shaft (5 or 105), which shaft projects outwardly from a transmission case;

a sprocket cover (11 or 131) for covering the drive sprocket;

a gear case (15 or 133) for housing the input gear and the output gear; and a connecting means (5b) provided at an end of the output shaft (5 or 105) of the transmission for connecting a rotating shaft (14a) of the input gear (14) to the output shaft (5 or 105) of the transmission; with the gear case (15 or 133) being operable to support the rotating shaft of the input gear for detachable driven engagement with the connecting means of the output shaft (5 or 105) of the transmission.

In the separable gear case species of the invention, as described in connection with FIGS. 1–7, the improvement further comprises:

a seating surface (11a) formed on the sprocket cover (11), with the gear case (15) being removeably mounted on the seating surface (11a) such that the rotating shaft (14a) of the input gear is drivenly engaged with the connecting portion of said output shaft of the transmission.

In the integrated gear case/sprocket cover embodiment, the invention further resides in the generic combination wherein:

the gear case (133) for housing the input gear and the output gear is formed integrally with the sprocket cover (131), projects into an interior, generally central area housed by the sprocket cover (131), is disposed in general axial alignment with the output shaft (105) of the transmission, and is operable to dispose the input gear in detachable driven cooperation with the connecting means provides at the end (105a) of said output shaft (105) of said transmission; and a protecting cover portion (134) is formed integrally with a forward facing portion of the sprocket cover (131), with the protecting cover portion being operable to protect and shield conduit connection means (122 and/or 124) associated with the transmission.

With the invention having thus been described, those skilled in the speedometer power take-off technology and familiar with this disclosure will recognize additions, deletions, substitutions, equivalents, and modifications falling within the scope of the invention as set forth in the appended claims.

What is claimed is:

1. In a device for taking-off power from a rotary output shaft of a transmission through an output gear connected to a speed meter cable and an input gear meshing with said output gear to a speedometer in a motorcycle;

the improvement comprising a drive sprocket mounted on a projecting portion of said output shaft, which shaft projects outwardly from a transmission case;

a sprocket cover for covering said drive sprocket;

a gear case for housing said input gear and said output gear; and a connecting means provided at an end of said output shaft of said transmission for connecting a rotating shaft of said input gear to said output shaft of said transmission; and said gear case being operable to support said rotating shaft of said input gear for detachable driven engagement with said connecting means of said output shaft of said transmission.

2. A device for taking-off power from a rotary output shaft of a transmission as described in claim 1 wherein the improvement further comprises:

a seating surface formed on said sprocket cover, said gear case being removably mounted on said seating surface such that said rotating shaft of said input gear is drivenly engaged with said connecting portion of said output shaft of said transmission.

3. A device for taking-off power from a rotary output shaft of a transmission as described in claim 1 wherein:

said gear case for housing said input gear and said output gear is formed integrally with said sprocket cover, projects into an interior, generally central area housed by said sprocket cover, is disposed in general axial alignment with said putput shaft of said transmission, and is operable to dispose said input gear in detachable driven cooperation with said connecting means provided at the end of said output shaft of said transmission; and a protecting cover portion is formed integrally with a forward facing portion of said sprocket cover, said protecting cover portion being operable to protect and shield conduit connection means associated with said transmission.

* * * * *